United States Patent Office 3,401,271
Patented Sept. 10, 1968

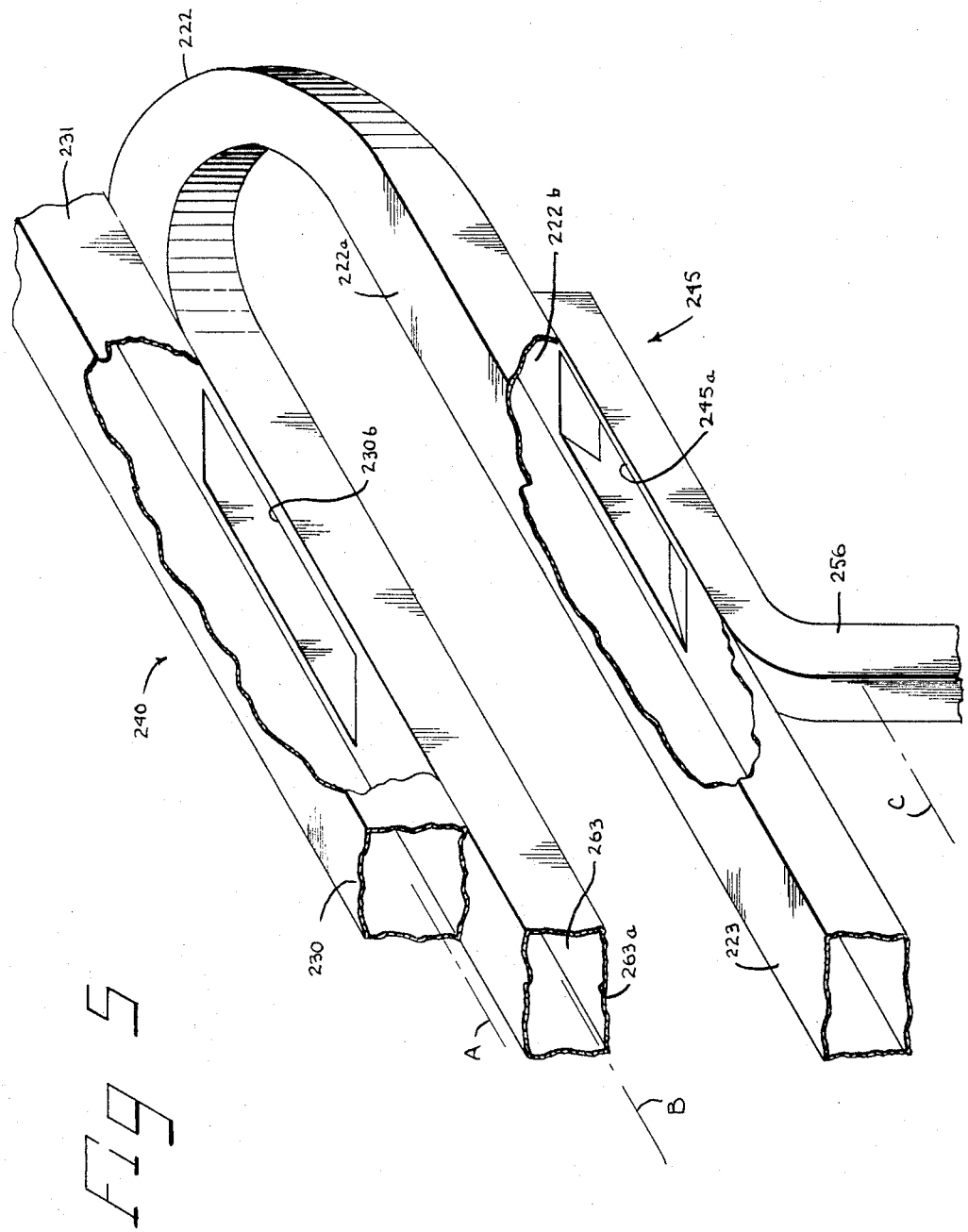

3,401,271
SYSTEM FOR AUTOMATIC CHANGE OF
FUNCTION OR CAPACITY
Richard R. Landers, Beachwood, Ohio, assignor to
TRW Inc., a corporation of Ohio
Filed July 5, 1963, Ser. No. 293,029
10 Claims. (Cl. 307—92)

This invention relates to automatic equipment and particularly to automatic equipment capable of self-repair and/or a change of function, size or capacity upon command or in response to the occurrence of a condition.

Present technological programs call for levels of reliability and endurance not achievable in current equipment without the use of excessive repetition of entire systems. In space travel, for example, if multiple equipments are provided in a stand-by capacity in the event of malfunction, this would impose a prohibitive weight and volume penalty. For this reason, equipment that repairs itself is desirable. Also, in limited quarters, it is desirable to have equipment that can change funtions, as for instance from a process control computer to a navigational determining computer, as the need arises, rather than providing duplicate equipment. Furthermore, in certain circumstances such as space travel or in unattended locations, it is essential that the equipment perform all of the functions expected of it with a minimum of attention, or none at all, of a support nature other than initially providing it with its power constituent parts replenishment requirements.

In advanced electronic systems, especially those intended for extended duration applications, as in the case of space missions and unattended installations, reliability requirements approach one hundred percent with 100% confidence levels. Such requirements can be met only by systems having a reliability unattainable with conventional approaches, notwithstanding the conventional use of redundant systems with means for switching from one to another.

It is therefore an object of the present invention to provide a self-repairing and self-sustaining system, without repetition of entire systems, or mechanisms.

It is a further important object of this invention to provide an electronic system having a self-replacing electronic sub-assembly, or element, capable of self-diagnosis for internal failure and of initiating its own replacement in the system.

It is a further object of the present invention to provide equipment capable of a change of function, size or capacity.

A feature of the invention resides in the provision of elements each capable of performing a plurality of different functions depending upon the location of the elements or other conditions.

A further feature of the invention resides in the provision of elements capable of self-removal in response to a condition such as a failure or external command.

A still further feature of the invention resides in the circulation of a plurality of elements past one or more operating positions and means for removing defective elements automatically from the primary circulation paths.

Another feature of the invention resides in the positioning of randomly movable elements by means of a pulsating force field.

Still another feature resides in the provision of means for automatically interconnecting a desired number of elements and to change the number of interconnected elements so as to carry out a change of size or capacity or the like.

Other and further important objects and features of this invention will become apparent to those skilled in the art from the following detailed disclosure of preferred embodiments of the invention as shown in the drawings attached hereto and made a part hereof.

Figure 1:
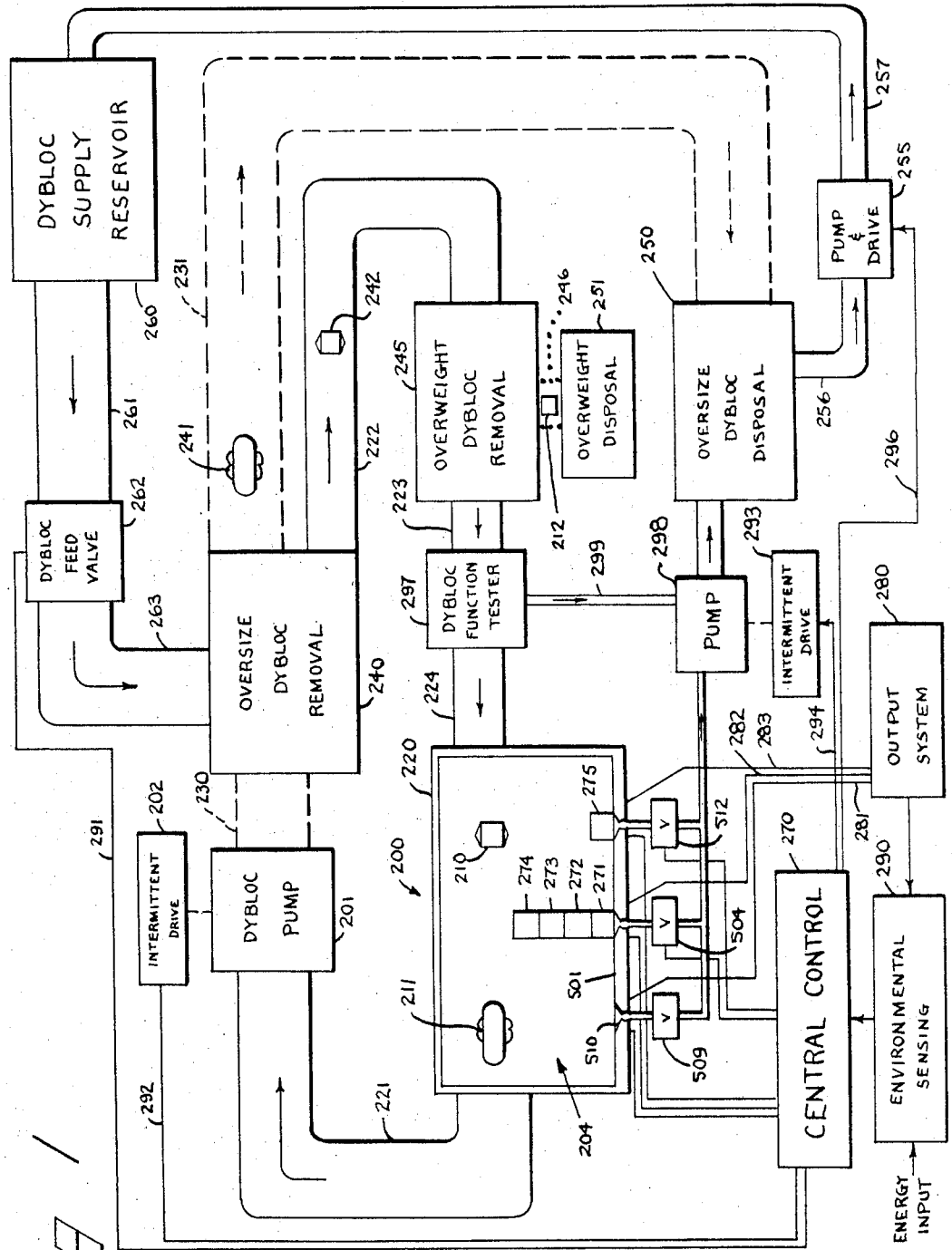
FIGURE 1 is a somewhat diagrammatic view representing a system in accordance with the present invention.
Figure 2:
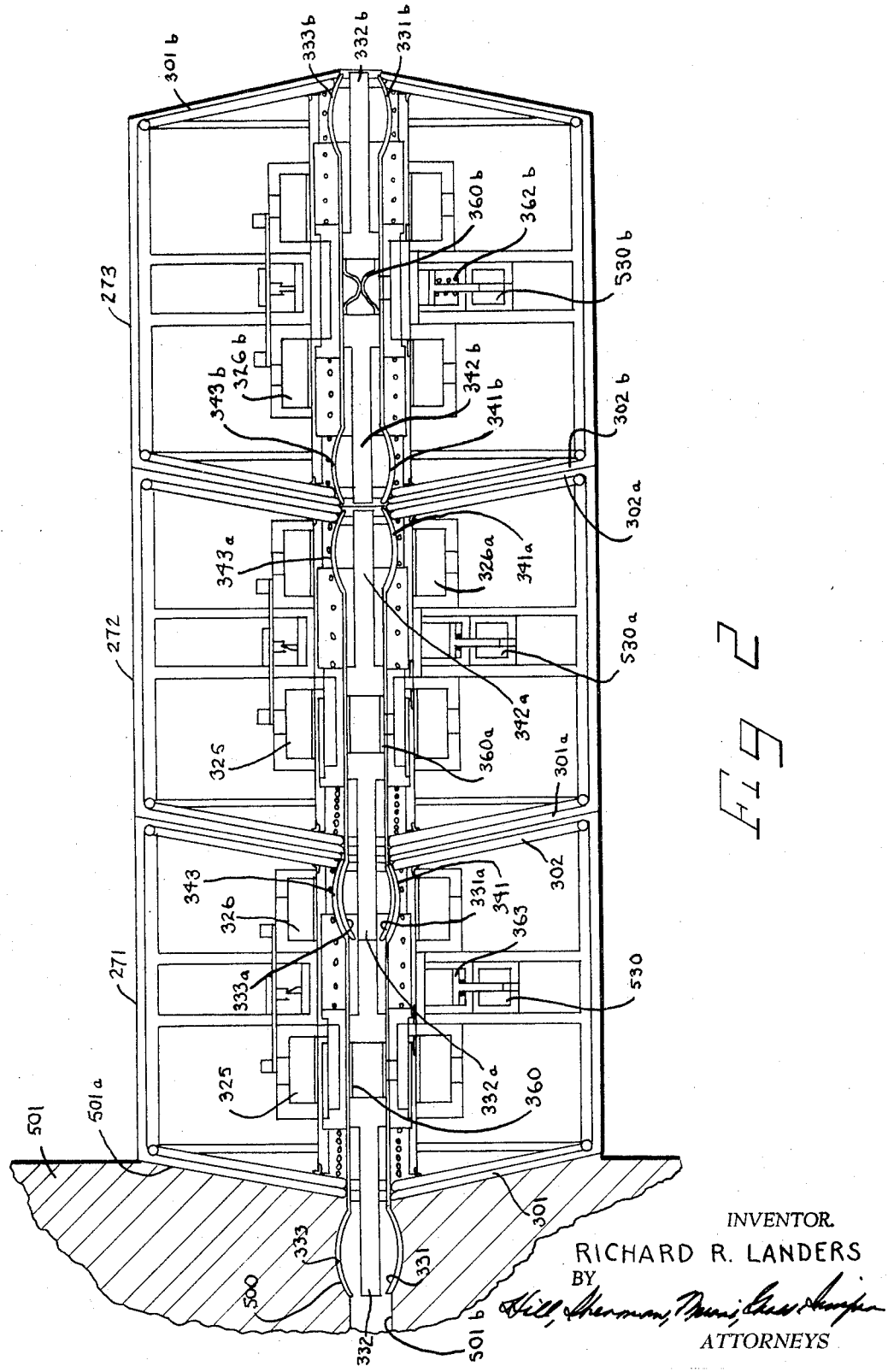
FIGURE 2 is a somewhat diagrammatic vertical sectional view showing a series of dyblocs at an operating position of the system of FIGURE 1 and showing certain exemplary details of construction.
Figure 4:
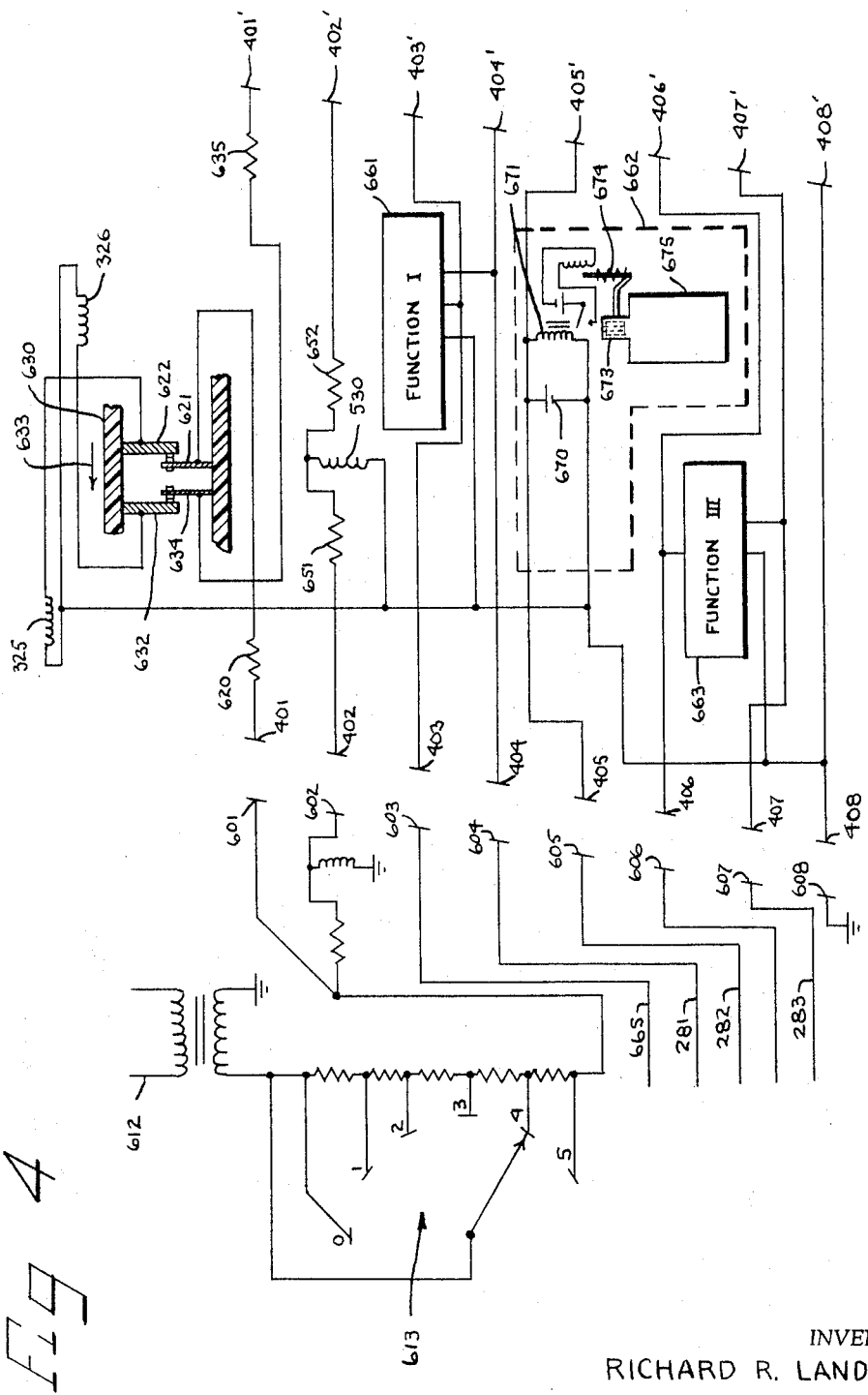

FIGURE 4 is a schematic electric circuit diagram for illustrating the electric circuit connections with a dybloc such as indicated at FIGURE 2 in association with a fixed septum in the system of FIGURE 1; and FIGURE 5 is a somewhat diagrammatic perspective view with certain portions broken away to illustrate exemplary details of the oversize dybloc removal component and of the overweight dybloc removal component of FIGURE 1.

As shown on the drawings:

FIGURE 1 is an overall diagram of an embodiment of the present invention. The system of FIGURE 1 serves to illustrate a system utilizing dyblocs to accomplish a change of size or capacity or a change of function, for example.

The system of FIGURE 1 comprises an envelope 200 in which a dielectric fluid is circulated by means of a pump 201 having a suitable intermittent drive 202. The drive 202 is energized for sufficient intervals to produce a pulse of fluid flow in the main chamber 204 of the system. The pump 201 is of a configuration to pass different size dyblocs such as indicated at 210, 211 and 212. The dybloc 211 in the exemplary system shown is substantially oversize and relatively buoyant in the system, while the dybloc 212 is undersized and may be incapable of floating in the fluid of the system.

FIGURE 1 may conveniently be thought of as representing a plan view of the system with the gravitational field disposed generally normal with respect to the plane of the system. Specifically envelope part 220 defining the central chamber 204 may be thought of as lying in a plane or other surface of constant gravitational acceleration which may be termed plane B. Pump 201 may have its intake side at plane B and its outlet side at plane A which is at a greater distance from the source of the gravitational field so that the gravitational force tends to move bodies from plane A to plane B. Thus, it may be stated that plane A is at a higher level than plane B. Conduits 230 and 231 are at plane A and above the level of conduits 221–224. The normal size dyblocs such as indicated at 210 may be assumed to be essentially in a floating condition at level or plane B, but to be too "heavy" to reach level or plane A. Oversize dyblocs such as indicated at 211 may be considered dyblocs that will normally float above the level of plane A.

An oversize dybloc removal component 240 is indicated as interposed between input line 230 and output lines 222 and 231 so as to serve to segregate oversize dyblocs such as indicated at 211 and at 241 from normal dyblocs such as indicated at 210 and 242. The component 240 may also be assumed to transmit overweight dybloc component such as indicated at 212 to the line 222 leading to the overweight dybloc removal component 245. Conduit 246 leading from the overweight dybloc removal component 245 may be assumed to be at a substantially lower level than level B, which level will be termed level C, and it may be assumed that normal dyblocs are too buoyant to reach level C.

For diagrammatic purposes, the parts of the envelope 200 which are in plane B have been shown by solid lines, while the conduits 230 and 231 which are in plane A have been shown by dash lines. Conduit 246 which is in plane C below plane A has been shown by dotted lines.

An oversize dybloc disposal system is designated by the reference numeral 250 and receives oversize dyblocs such as indicated at 241 via conduit 231. An overweight dybloc disposal component is indicated at 251 receiving overweight dyblocs such as indicated at 212 from the overweight dybloc removal unit 245. It may be assumed that the conduit 246 is inclined "downwardly" with respect to plane C so that the elements 212 will travel therealong by gravitational force. The disposal components 250 and 251 may comprise any suitable system for storing and/or disposing of discarded material. For example, these components may include means for grinding or otherwise compressing the volume of the discarded elements. Suitable pump means may be provided as indicated at 255 for drawing oversize dyblocs such as indicated at 241 along the conduit 231. The input line of pump 255 indicated at 256 is, of course, suitably screened so as to prevent dybloc material from entering the line 256. The output of pump 255 indicated at 257 may connect with any convenient point of the system such as a dybloc supply reservoir 260 which may contain a supply of new dyblocs predominantly of the normal size as indicated at 210. Fluid discharged by pump 255 may flow continuously or intermittently as desired through conduit 257 of less than dybloc size through dybloc supply reservoir 260 and through a conduit 261 which is of size to pass dyblocs. A dybloc feed valve 262 may control the supply of dyblocs to a delivery conduit 263, but the valve 262 may be such as to allow flow of fluid at all times. The output side of pump 255, conduit 257, dybloc supply reservoir 260, conduit 261 and conduit 263 may all be located at plane or level B.

The dybloc feed valve 262 may be opened selectively by means of a central control component 270 in response to a condition indicating the need for further dyblocs, for example.

By way of example, dyblocs such as indicated at 271–274 and 275 may be operatively connected with an output system indicated at 280. The central control component 270 may signal for a desired output at each of cables 281, 282 and 283, and an environment sensing component 290 may include means for determining the functioning of outputs 281, 282 and 283. Central control 270 may be coupled to sensing means 290 and thus determine whether the output 281–283 are in accordance with the desired values. A failure of a desired output over a predetermined time interval might be one signal which would cause central control 270 to energize or open dybloc feed valve 262 via control line 291. By way of further example, central control 270 might completely deenergize intermittent drive 202 by means of line 292 and might completely deenergize intermittent drive 293 by means of line 294. The pump and drive component 255 might also be deenergized by means of line 296.

An electric test component 297 has been indicated between lines 223 and 224 and optionally may be included in the system to provide for electrical testing of each dybloc before its delivery to the central chamber 204. If a given dybloc delivered to the test component 297 is found to be defective with respect to any of its desired functions with respect to the output system 280, the tester component 297 may cause the dybloc to assume an oversize condition as indicated for dybloc 211 which will effectively prevent the dybloc from being interconnected with the output system 280.

For purposes of simplicity in this disclosure, details of the dybloc function tester are omitted, and it may be assumed that conduits 223 and 224 are directly connected for the purposes of further discussion herein. A pump unit 298 is driven from drive component 293 and its fluid connection with tester component 297 which is indicated at 299 may likewise be considered as being closed for the purposes of further discussion herein.

Figure 3:
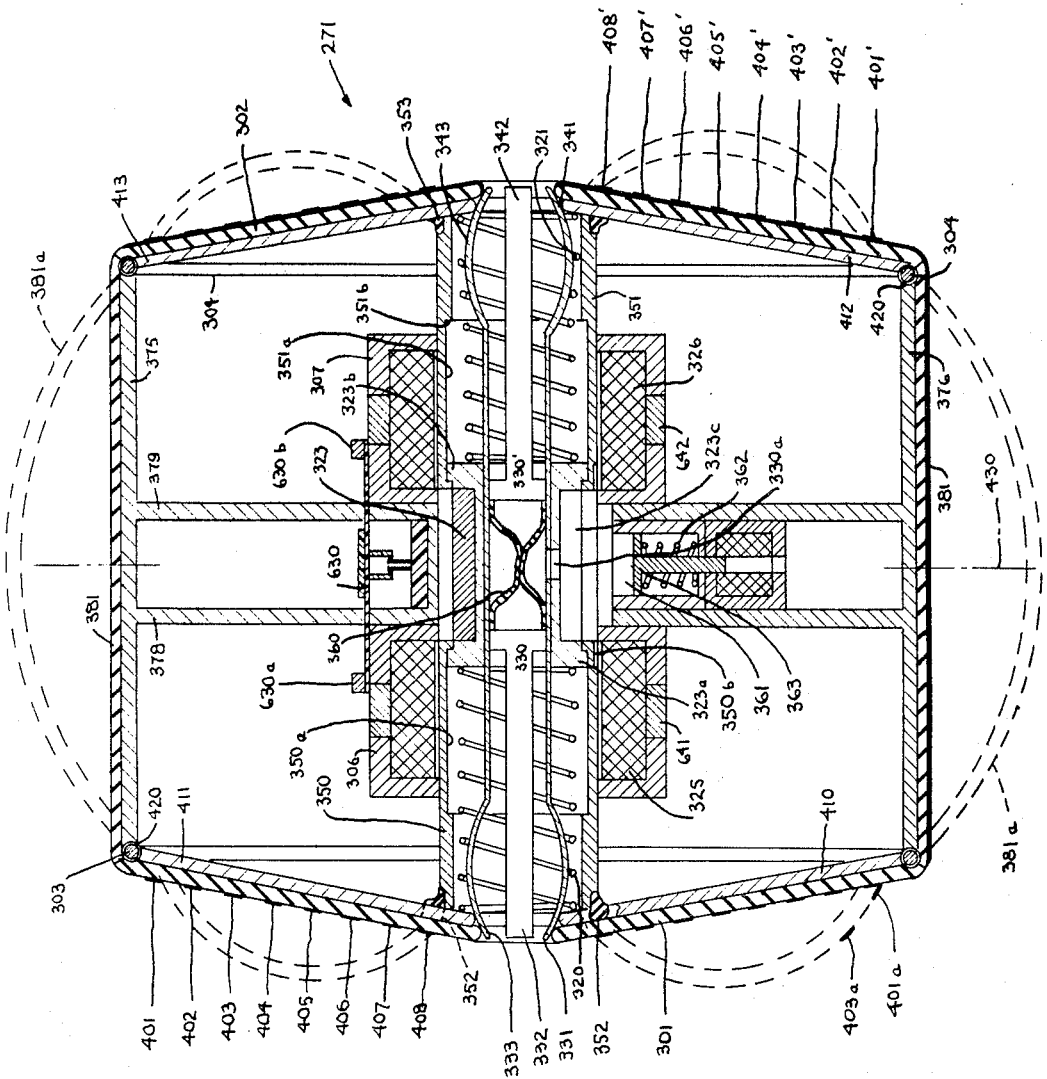
FIGURE 3 is an enlarged somewhat diagrammatic view showing further exemplary details of a dybloc or operating element in accordance with the present invention.

FIGURE 3 is a somewhat diagrammatic view showing an example of dybloc structure which would perform the various functions heretofore generally described. It will be understood that the illustrated details are for the purpose of example and not of limitation.

Referring to FIGURE 3 the dybloc 271 of FIGURES 1 and 2 is shown in its normal condition prior to attachment to an operating position of the septum or to other dyblocs. The dybloc structure comprises a pair of cone shaped parts 301 and 302 which are pivotally carried on circular rings 303 and 304. The rings 303 and 304 may be part of a rigid skeleton for the dybloc which insures that the normal condition of the dyblocs such as 271–275 will be substantially identical. Further parts of the rigid structure include magnetic cores 306 and 307. Compression springs 320 and 321 are provided acting between the armature ring assembly 323 and the cones 301 and 302 to urge the cones 301 and 302 to their outward positions shown in FIGURE 3.

Solenoids are indicated at 325 and 326 for energization to attract the armature ring assembly 323 in respective opposite directions. FIGURE 2 illustrates the situation with the solenoid 326 of dybloc 271 energized so that the armature ring 323 is in a lefthand position.

Driving of the armature 323 leftwardly as viewed in FIGURE 2 drives center tube sections 330 and 330′ which are secured to the armature 323 in the leftward direction. The free ends of the tube sections 330 and 330′ are provided with spring fingers such as indicated at 331–333 and 341–343. As the armature and tube sections move leftwardly the four reinforcing bars such as 410 and 411 cause the fingers such as 341–343 to constrict and then to expand again as the fingers move below the surface of cone 302.

A pair of tubes 350 and 351 of non-magnetic metallic material are secured to the cones 301 and 302, respectively, by means of rubber cement as indicated at 352 and 353. As the armature 323 moves leftwardly, a lug 323a thereon engages in the end of a slot 351a and moves the tube 351 with the armature 323. The cone 302 is moved from its outward convex condition to an inward concave condition as shown in FIGURE 2 by virtue of the connection at 353 between tube 351 and cone 302. The lug 323b on armature 323 which is similar to lug 323a rides freely in a slot 350a until it reaches the end of the slot indicated at 350b.

By way of example as seen in FIGURE 3 the tube sections 330, 330′ may be formed of a single piece of non-magnetic metal with an aperture 330a leading to the interior of an elastic membrane 360 secured to the inner faces of the tube sections 330, 330′. A hydraulic cylinder 361 is arranged to supply fluid pressure to the membrane 360. The fluid pressure is supplied through passage 351b in non-magnetic tube 351 and a slot 323c in armature ring 323 in the left position of armature ring 323 shown in FIGURE 2. The hydraulic pressure produced by a spring 362 acting on piston 363 in cylinder 361 is sufficient to fully expand the membrane 360 to close the passage through the center of the tube sections 330, 330′.

The extent of movement of the armature ring 323 from the position of FIGURE 3 to that of FIGURE 2 is such that cone 302 has a surface configuration complementary to that of the external surface configuration of cone 301 so that successive dyblocs may be mated with the orientation thereof shown in FIGURE 2.

As indicated somewhat schematically in FIGURE 3, the skeleton of the dybloc includes in addition to rings 303 and 304, axially extending rods such as 375 and 376 at suitably spaced intervals about the periphery of the dyblock with associated connecting radial arms such as indicated at 378 and 379 of non-magnetic material secured, for example, to axially extending non-magnetic members such as 380 and to cores 306 and 307. Over this cylindrical frame is stretched as resilient cylindrical membrane indicated at 381 which is of an elastic material and is secured at its opposite axial ends to the cones 301 and 302. The membrane is under sufficient tension in its normal cylindrical configuration and is sufficiently supported by the skeleton of the dybloc so that it will maintain its shape when subjected to the normal range of fluid pressures within envelope 200. The temperature of the fluid within envelope 200 may be maintained constant by any suitable means. The membrane or skin 381 may be greatly expanded out of the cylindrical configuration as indicated at 381a in FIGURE 3 in the event of a dybloc failure. By way of example in response to failure of any of the functions contained within the dybloc, compressed air may be released within the dybloc so as to greatly distend the skin 381 signalling a failure at the dybloc. Such dyblocs may be excluded from the circulatory system as has been described herein.

The cones 301 and 302 are sufficiently stiff to insure that contact rings 401–408 and 401′–408′ printed or electrodeposited thereon will properly engage corresponding contacts of other mating dyblocs. On the other hand the cones are sufficiently flexible so that the cones may be inverted as shown for cone 302 in FIGURE 2. The cones may be reinforced by rigid members such as 410, 411 and 412, 413 which in turn are pivotally mounted on circular rings 303 and 304 by means of sleeves such as indicated at 420. The members such as 410–413 may be secured to the cones 301 and 302 only at the inner and outer peripheries thereof for example by means of rubber cement as at 352 and 353 to allow flexure of intermediate portions of the cones during inversion thereof. The rubber cement 352 and 353 may form continuous sealing rings between tubes 350 and 351 and cones 301 and 302 to seal the interior of the dybloc.

The sealing rings 352 and 353 may be applied between the tubes 350 and 351 and the reinforcing members such as 410–413 while the members 410–413 are at right angles to the axes of tubes 350 and 351 and with the ends of the tubes against the members 410–413. The joints provided by rubber cement 352 and 353 are sufficiently resilient to allow slight relative movement between the members 410–413 and the tubes 350 and 351 as the tubes are reciprocated and the members 410–413 pivoted. The joints 352 and 353 will serve to cause the cones 301 and 302 to move conjointly with the respective tubes 350 and 351 at all times.

Of course, sealing rings or the like may be provided at other points as required within the dybloc to seal the interior spaces of the dybloc from the central axial passage through the dybloc as desired. Alternatively or in addition, plastic material may be disposed within the interior spaces of the dyblocs and have suitable air chambers to provide the desired buoyancy of the dyblocs.

The dyblocs in the illustrated embodiment should, of course, be balanced so that the center of mass corresponds with the central diametric plane of the dybloc such as indicated at 430 in FIGURE 3. In the illustrated embodiment, it is advantageous to have the center of mass of the dybloc offset from the axial center of the dybloc so that the dybloc will tend to float with its central axis in a horizontal plane, that is at right angles to the gravitational field. With the center of mass offset, the cones may have relatively large numbers of contacts since the cones will tend to mate with a predetermined angular relationship.

Referring to FIGURE 2, the structure of dyblocs 272 and 273 is, of course, identical to that of dybloc 271, and corresponding parts of dybloc 272 have been designated by the same reference numerals as for dybloc 271 followed by the letter a, while corresponding parts of dybloc 273 are designated by the same reference numeral followed by the letter b. It will be noted that dybloc 272 has its cone 301a to the left in correspondence with the left hand position of cone 301 of dybloc 271, while cone 301b of dybloc 273 corresponding to cone 301 is shown to the right to indicate that the dyblocs are entirely symmetrical with respect to the central diametric plane.

Dybloc 271 is shown with its solenoid 325 energized so as to interlock spring fingers such as 331–333 with a corresponding receptacle 500 of an operating position of septum wall 501. The septum wall 501 is indicated in FIGURE 1 and defines a side of central chamber 204 in which the dyblocs are located. The wall 501 is provided with a mating conical surface as indicated. The surface 501a is, of course, provided with contract rings for mating with the contact rings 401–408 of dybloc 271. (See FIGURE 3).

The septum 501 is provided with a fluid passage 501b through which fluid is drawn from central chamber 204 by means of pump 298. A valve is indicated at 504 in FIGURE 1 for controlling flow in the passage 501b. The valve 504 may be a solenoid valve which is energized to open the passage from the central control 270 when it is desired to attract one or more dyblocs to the operating position 501a. Referring to FIGURE 1, it may be assumed that valve 509 associated with operating position 510 is deenergized and closed so that no dyblocs will be attracted to this operating position. Valve 512 associated with the operating position having dybloc 275 is energized and open. The pump 298 is energized intermittently at least when a change of size or function is desired so that dyblocs are attracted to active operating positions with a pulsating force. The duration of the force in each pulse is sufficient to enable the making of the contacts required to energize the solenoids such as 325 which interlock the dyblocs with the operating positions.

With dybloc 271 in place, if a further dybloc is desired at the operating position, a solenoid 530 is energized retracting piston 363 against the action of compression spring 362, FIGURE 3, so as to relieve the pressure on diaphragm 360 and allow the diaphragm 360 to assume its normal cylindrical shape as indicated in FIGURE 2. In this position of the diaphragm, a fluid passage is completed through the center of dybloc 271 to the passage 501b so that the cone 302 acts as an operating position to attract dybloc 272. Dybloc 272 when it reaches the correct position will have its solenoid 325a energized at a time when the dybloc is being attracted and held against the dybloc 271 by the fluid pressure so as to interlock fingers such as 331a–333a of dybloc 272 with fingers 341–343 of dybloc 271.

Where still a further dybloc is desired, solenoid 530a of dybloc 272 will be energized to open diaphragm 360a as shown allowing fluid to flow through the center passage of dybloc 272 and then through the passage of dybloc 271 and passage 501b so as to establish a force field tending to attract a further dybloc to cone 302a of dybloc 272.

In FIGURE 2, dybloc 273 is shown arriving at the operating position with respect to dybloc 272 and just prior to the energization of solenoid 326b which will serve to project fingers 341b–343b into interlocking relation with fingers 341a–343a. If a still further dybloc is desired, solenoid 530b will be energized to open diaphragm 360b and thus to establish a force field for directing further dyblocs to mating relation with cone 301b of dybloc 273.

The structure and operation of the other operating positions of septum 501 may, of course, be entirely similar so that a further description thereof is deemed unnecessary.

With a pulsating energization of pump 298, a dybloc is first subjected to a force field tending to move the dybloc toward one of the operating positions which requires a further dybloc. After the dybloc has moved a substantial distance in the force field, the intensity of the force field may be momentarily reduced and the pulsating movement of the fluid due to pump 201 may cause slight movement of the dybloc. The result is an agitation and randomness of dybloc position which insures that the dybloc will ultimately be positioned at the proper relationship to the operating position. There is no possibility of the dybloc being held by the fluid flow into an operating position continuously in a wrong orientation. On the other hand, as soon as the dybloc assumes the correct orientation, contact is made with the contact rings such as 401–408 so as to immediately energize the correct solenoid 325 or 326 for interconnecting the dybloc with the operating position. The pump 298 operates for a sufficient interval to insure that the dybloc will be held in its correct position until the correct solenoid has been fully energized and the mechanical interconnection effected.

Referring to FIGURE 4, there is illustrated the electric circuit associated with the septum 501 and position 501a thereof, FIGURE 2, in association with the electric circuitry of dybloc 271. As illustrated in FIGURE 4, operating position 501a of the septum may include contact rings 601–608 for engagement with contact rings 401–408 of dybloc 271. An alternating current source 612 supplies an actuating voltage between rings 601 and 608 through a selector mechanism 613. With the actuating voltage provided by the selector mechanism as viewed in FIGURE 4, the left hand solenoid winding 325 will be energized through the following circuit: Contact ring 401, resistor 620, spring contact finger 621, rigid contact finger 622, solenoid winding 325, and contact ring 408. The resultant energization of solenoid 325 serves to drive the insulating arm 630 carrying rigid contacts 622 and 632 in the direction of arrow 633 to first disengage contact arm 632 from spring contact arm 634 and then to engage rigid arm 622 and spring arm 621 with spring contact arm 634. In the energized condition of solenoid 325, a circuit is completed from ring 401 through resistor 620, through spring contact arms 621 and 634 and through resistor 635 to contact ring 401′ at the right end of the dybloc 201.

A means for actuating non-conducting arm 630 in the direction of arrow 633 upon energization of solenoid 325 has been diagrammatically indicated in FIGURE 3 wherein it will be seen that the arm 630 is mounted for axial reciprocation and carries respective armature pieces 630a and 630b which cooperate with cores 306 and 307 of windings 325 and 326. The cores 306 and 307 are provided with non-magnetic rings as indicated at 641 and 642 which secure the rings as a unit but provide for actuation of the armature pieces 630a and 630b upon energization of solenoids 325 and 326 respectively.

The result of energization of solenoid 325 is to provide a predetermined voltage between contact rings 401′ and 408′ which may or may not be sufficient to actuate the solenoids of succeeding dyblocs. The resistances of the selector 613 are correlated with the resistors such as 620 and 635 of each dybloc so that each setting of the selector 613 corresponds to energization of a predetermined number of dyblocs.

Where four dyblocs are to be positioned as indicated at 271–274 in FIGURE 1, selector 613 would be at position four so as to supply a sufficient voltage at contact rings 401′ and 408′ to energize the solenoids of three additional dyblocs. The contact rings corresponding to 401′ and 408′ of dybloc 274, however, would not have a sufficient voltage therebetween to energize the solenoid of a further dybloc. Conversely, if selector 613 is moved to position 3, the solenoid such as 325 of dybloc 274 would be deenergized whereupon the compression spring corresponding to compression spring 320, for example, in FIGURE 3 would retract the spring fingers such as 331–333, allowing the dybloc 274 to be removed from the operating position.

Selector means 613 also provides a voltage at septum contact rings 602 which is correlated with the voltage supplied to contact rings 601 so as to energize the solenoid 530 of a first dybloc when contact ring 602 provides a voltage sufficient to interconnect a further dybloc with the first dybloc. Thus, if selector 613 provides a sufficient voltage at 601 to interconnect four dyblocs such as 271–274, contact ring 602 will provide a voltage sufficient to energize solenoids such as 530 of the first three dyblocs, for example dyblocs 271–273.

As indicated in FIGURE 4, voltage dropping resistors 651 and 652 are interposed between contact rings 402 and 402′ so that the voltage supplied to the successive contact rings of successive dyblocs will be reduced.

Thus, if it is desired to remove dyblocs 272–274, selector 613 is moved to position No. 1 supplying a sufficient voltage to contact rings 601 to energize only the solenoid 325 of dybloc 271. At the same time contact ring 602 receives an insufficient voltage to energize solenoid 530 so that the diaphragm valve 360 of solenoid 271 is closed and no further dyblocs will be held in the operating position or attracted thereto.

Simply by way of example, a function I component designated by the reference numeral 661 has been shown as being connected to contact rings 403, 404 and 408. The component 661 is, by way of example, also shown as connected with contact rings 403′, 404′ and 408′ so that the function I component 661 of successive dyblocs will be connected in parallel. Septum contact ring 603 has been indicated as associated with an input line 665 while septum contact ring 604 is indicated as associated with output line 281 corresponding to the output line 281 leading to the output system 280 in FIGURE 1. A function II component has been indicated at 662 in FIGURE 4 and a function III component has been indicated at 663. The function II component, simply by way of example, has been indicated as comprising a battery 670 having its positive terminal connected to contact rings 405 and 405′ and its negative terminal connected to contact rings 408 and 408′.

Also simply by way of example, a solenoid has been indicated diagrammatically at 671 which is connected across the battery 670 so that the solenoid 671 remains energized as long as the function II component such as battery 670 is operating properly. Upon a predetermined failure condition of battery 670, solenoid 671 is no longer effective to maintain a valve 673 in a closed condition against the action of a compression spring 674 so that the valve 673 is opened. The valve 673 may be associated with a container 675 containing compressed air or the like so that upon failure of the battery 670, air under substantial pressure will be introduced into the interior space of dybloc 271 causing the dybloc to expand to the condition indicated at 381a in FIGURE 10. The compressed air may also distend cone 301 as indicated at 301a in such a way as to disconnect contact ring 401 from septum contact ring 601 causing release of solenoid 325 of dybloc 271 and release of the solenoids of the succeeding dyblocs such as 272–274. Thus, a failure condition in dybloc 271, for example, may be automatically sensed by the dybloc causing the dybloc to remove itself from the operating position at septum 501.

FIGURE 5 illustrates certain exemplary details of the oversize dybloc removal component 240 and the overweight dybloc removal component 245 of FIGURE 1. Corresponding reference numerals have been applied to similar parts so that the structure and operation of the arrangement of FIGURE 5 will be apparent. Generally, it may be assumed that the conduit 230 is at a level A at which normal dyblocs are incapable of floating so that normal dyblocs will be carried along the bottom wall 230a of conduit 230 and fall through opening 230b to the conduit 263 which is at level B corresponding to the level envelope part 220 housing the central chamber 204. It may be assumed that the conduit 263, the conduit 222 and the conduit 223 have sufficient vertical extent so that substantially all of the normal size dyblocs such as indicated at 242 in FIGURE 1 will be in a floating condition between the upper and lower walls such as walls 222a and 222b in FIGURE 5. Undersize or overweight dyblocs, however, such as indicated at 212 in FIGURE 1 will be carried along in contact with the bottom wall 263a of conduit 263 and in contact with the bottom wall 222b of conduit 222 so that these components will fall through opening 245a at overweight dybloc removal component 245 in FIGURE 5. Normal dyblocs will float above the bottom wall 222b and will not pass into the opening 245a but will continue across the opening and into conduit 223. The rate of fluid flow in the various conduits such as 231 and 256 is regulated so that the predominant flow of fluid is from conduit 230 through opening 230b to conduit 232 and from conduit 222 to conduit 223 so that there is no danger of losing normal size dyblocs in the removal components 240 and 245.

It should be appreciated that the exemplary details given herein are by way of example and not of limitation. By way of example, it is contemplated that the dyblocs may be moved to operating positions by gravity or magnetic attraction as well as by hydraulic pressure. It is also evident that where the gravitational field is substantially zero, a fluid would not be necessary within the envelope 200 in order to place the dyblocs in a randomly movable condition. For example, a traveling magnetic field could be provided for circulating the dyblocs in a weightless condition so that no fluid would be necessary within the envelope 200. It is contemplated that the dyblocs may have other shapes, and a very advantageous shape would be a 14-sided tetradecahedron since this configuration is the most nearly spherical flat-sided solid that will "nest" with other such objects into a solid mass with no voids. Each of the sides of the dybloc may be provided with means for interconnecting with other dyblocs such as the spring fingers 331–333 of the dybloc of FIGURE 3. Various means such as different materials at different sides of the dybloc could result in selective orientation of a 14-sided dybloc with respect to a septum operating position or with respect to other dyblocs. Thus the dyblocs need not be interconnected in only one direction but may interconnect in many different directions in three dimensional space. The contacts need not be at the exterior of the dybloc, but can be located within the dybloc sides and the fingers or probes which provide the mechanical interconnection of the dyblocs can also provide for electrical interconnection or the like.

With the illustrated system, if there were any substantial danger of short circuits between randomly moving dyblocs, suitable relay means could be provided within the dyblocs to disconnect all of the contact rings except the two rings 401 and 408 required for energization of the solenoid such as 325.

The dybloc pump indicated at 201 in FIGURE 8 may, for example, comprise a helical screw type rotor in a cylindrical casing with a motor driving the screw mounted at the axis of the casing by means of a suitable spider. The screw rotor would, of course, have the necessary pitch and diameter so as to freely pass all of the dyblocs such as normal size dyblocs 210 and oversize dybloc 211 in FIGURE 1.

It will be apparent that the environment sensing component 290 of FIGURE 1 may include devices automatically responsive to external conditions so as to signal the central control 270 which will be programmed to respond to such environmental conditions to activate operating positions such as indicated at 510 in FIGURE 1. As a simple example, a bimetallic thermal switch may close when the temperature external to the envelope 200 reaches a predetermined level to energize solenoid valve 509 and supply a predetermined activating voltage to the operating position 510 so that dyblocs will be assembled at this operating position when the environmental temperature reaches a predetermined level. Similarly, when the temperature falls below the predetermined value, solenoid valve 509 would be deenergized and the activating voltage would be removed from the operating position 510 causing the dyblocs which had assembled the operating position to remove themselves. It will be apparent that the selector 613 of FIGURE 4 may be activated and switched to its various positions in response to various environmental conditions as sensed by component 290 of FIGURE 1. The embodiment of FIGURES 1 through 5 may therefore be entirely self-regulating and change functions, size and capacity automatically in response to environmental conditions or other conditions as well as in response to external commands.

While in the illustrated embodiment a different operating position is shown for the performance of each function, it is evident that a given operating position may be activated to cooperate selectively with different sets of contacts of a dybloc so as to associate with different function components of the dybloc without the dybloc changing its position in the system.

As illustration of various ways in which the dybloc may respond to a failure of a desired function, in addition to the release of compressed air as given by way of example, the dybloc may respond to temperature, for example, by means of a bimetallic strip releasing spring means. Similarly a fuse wire in tension may melt in response to heat. Various chemical means may be provided for removing dyblocs upon the occurrence of a condition such as a failure. A wax may be melted by means of heat energy applied in any suitable way in response to a failure so as to release an acid substance into an alkaline dybloc fluid within the dybloc. The reaction releases gases which cause the dybloc to greatly expand as disclosed herein or to actually rupture. Many electrical and other ways will be apparent for removing dyblocs in response to various conditions.

It will be apparent that the dyblocs may be contained of various elements such as illustrated in FIGURE 1 at the septum 501 necessary for attracting other dyblocs thereto. This might include, for example, pumping means within a given dybloc or other force field means which could be selectively activated to attract other dyblocs. Thus, it is contemplated that the dyblocs may be interconnected in response to various commands or other conditions without any fixed septum operating position being required.

It is further contemplated that the dyblocs may be stored in the dybloc supply reservoir 260 in a collapsed or folded condition and selectively increased to normal size as they are placed into the circulating system. Other such modifications will be apparent to those skilled in the art.

It is further apparent that several different types of dyblocs may be circulated through a system having multiple numbers of primary units such as represented by envelope part 220, and various selector means and the like may be utilized for directing the flow of the different types of dyblocs as required and for selecting particular types of dyblocs for given operating locations.

It will also be understood that the dyblocs may carry fuel cells or the like for generating energy and that the raw materials for such cells may be delivered to the dyblocs by means of the plasma or fluid circulating within the envelope 200. The desired chemicals or other fuel may be suitably absorbed by the dybloc as will be apparent to those skilled in the art. The dyblocs may themselves be adapted to form structural walls defining the envelope 200 and to seal automatically any leaks in the envelope wall. Dyblocs exposed to external environmental conditions may be designed to harden or the like so as to provide the envelope wall.

It will also be apparent that while the embodiment of FIGURE 1 represents a relatively complex circulatory system, the embodiment would also have substantial utility if the dyblocs were contained within an envelope with selective activation of the various operating positions to call for one dybloc at each such operating position when activated.

The present application is related in subject matter to my copending application Ser. No. 153,445 filed Nov. 20, 1961 now U.S. Patent 3,274,401 issued Sept. 20, 1966.

It will be apparent that many further modifications and variations may be effected without departing from the scope of the novel concepts of the present invention.

I claim as my invention:

1. Automatic equipment comprising
    (a) an envelope,
    (b) a plurality of elements in said envelope capable of being interconnected directly with each other,
    (c) means for maintaining a plurality of said elements in a generally randomly movable condition in said envelope relative to a further one of said elements,
    (d) selectively operable means for automatically producing a force field in said envelope tending to move said elements toward a predetermined position relative to said further one of said elements, and
    (e) means automatically responsive to one of said plurality of elements reaching said predetermined position relative to said further one of said elements to interconnect directly said one and said further one of said elements.

2. The equipment of claim 1 with the elements having means providing for circulation of fluid therethrough and the circulation of fluid through said further one of said elements tending to move said elements toward said predetermined position.

3. Automatic equipment in accordance with claim 1 with said elements having a configuration substantially corresponding to that of a tetradecahedron.

4. Automatic equipment comprising
    (a) an envelope,
    (b) a plurality of first elements in said envelope capable of being interconnected with a second element which is identical to said first elements,
    (c) means for maintaining said first elements in a generally floating condition in said envelope and movable relative to said second element,
    (d) selectively operable means for automatically producing a pulsating force field in said envelope tending to move said first elements toward a predetermined position relative to said second element, and means automatically responsive to one of said first elements reaching said predetermined position relative to said second element to physically interlock said one of said first elements and said second element.

5. Automatic equipment comprising
    (a) an envelope,
    (b) a plurality of elements in said envelope capable of physical interconnection directly with each other,
    (c) means for circulating said elements,
    (d) means for establishing force fields tending to move said elements into direct physical interconnecting relation directly with each other, and
    (e) means for changing the number of interconnected elements physically interconnected directly with each other.

6. Automatic equipment in accordance with claim 5 with said elements having a substantially identical configuration, such configuration having substantially fourteen sides, and said elements being capable of fitting together with essentially no voids therebetween.

7. Automatic equipment comprising
    (a) an envelope,
    (b) means defining an element position in said envelope,
    (c) an operating element capable of being positioned at said element position,
    (d) a fluid medium in said envelope in which said operating element is immersed,
    (e) means for circulating said fluid medium past said element position, and
    (f) force field means for automatically providing a force field tending to move said operating element toward said element position, wherein the improvement comprises said element containing therein means for mechanically interlocking said element with said defining means.

8. In automatic equipment for operation within predetermined ranges of gravitational field and acceleration conditions,
    (a) a system comprising a plurality of first operating elements having respective operating positions,
    (b) a plurality of additional operating elements capable of being positioned at and functioning at each of said operating positions of said system,
    (c) means for automatically removing any of said operating elements from the respective operating positions in response to the occurrence of respective conditions, and
    (d) means automatically operable under said predetermined ranges of gravitational field and acceleration conditions for maintaining said additional elements substantially in a floating condition for movement to any of said operating positions and for moving one of said additional elements to each operating position from which an operating element is removed until substantially all of said additional operating elements have been utilized in said system, wherein the improvement comprises said additional operating elements being capable of direct mechanical connection with said first operating elements for joint functioning therewith.

9. Automatic equipment comprising means defining a plurality of element positions, elements capable of being positioned at the respective element positions and each having function performing means therein for performing a useful function in relation to said defining means, and means for maintaining said elements in a randomly movable condition, wherein the improvement comprises force field means at each of said element positions for providing a force field tending to move said elements toward the associated element position; said force field means each being shiftable between an active condition in which the force field is provided at the associated element position and an inactive condition in which the force field is absent at the associated element position, independently of the condition of the other force field means; and each of said force field means being capable of assuming its inactive condition even in the absence of an element at the associated element position.

10. Automatic equipment comprising means defining an element position, an element capable of being positioned at said element position, means for circulating said element along a path extending past said element position, force field means for automatically providing a force field tending to move said element toward said element position and to retain said element at said element position, and wherein the improvement comprises said force field means being shiftable between an active condition in which the force field is provided at the element position and an inactive condition in which the force field is absent at the element position, and said force field means being shiftable to said inactive condition while said element is at said element position and is in an operative condition.

References Cited

UNITED STATES PATENTS

| | | | |
|---|---|---|---|
| 2,853,300 | 9/1958 | Montooth | 273—43 |
| 2,964,184 | 12/1960 | Gillette | 209—225 |
| 3,015,394 | 1/1962 | Woods | 209—225 |
| 3,089,994 | 5/1963 | Williams | 307—141 |
| 3,131,974 | 5/1964 | Futer | 302—31 |
| 3,174,751 | 3/1965 | Martin | 273—43 |
| 3,199,932 | 7/1965 | Clark | 308—10 |
| 3,274,401 | 9/1965 | Landers | 307—92 |

ROBERT K. SCHAEFER, *Primary Examiner.*

T. B. JOIKE, *Assistant Examiner.*